Patented Oct. 29, 1946

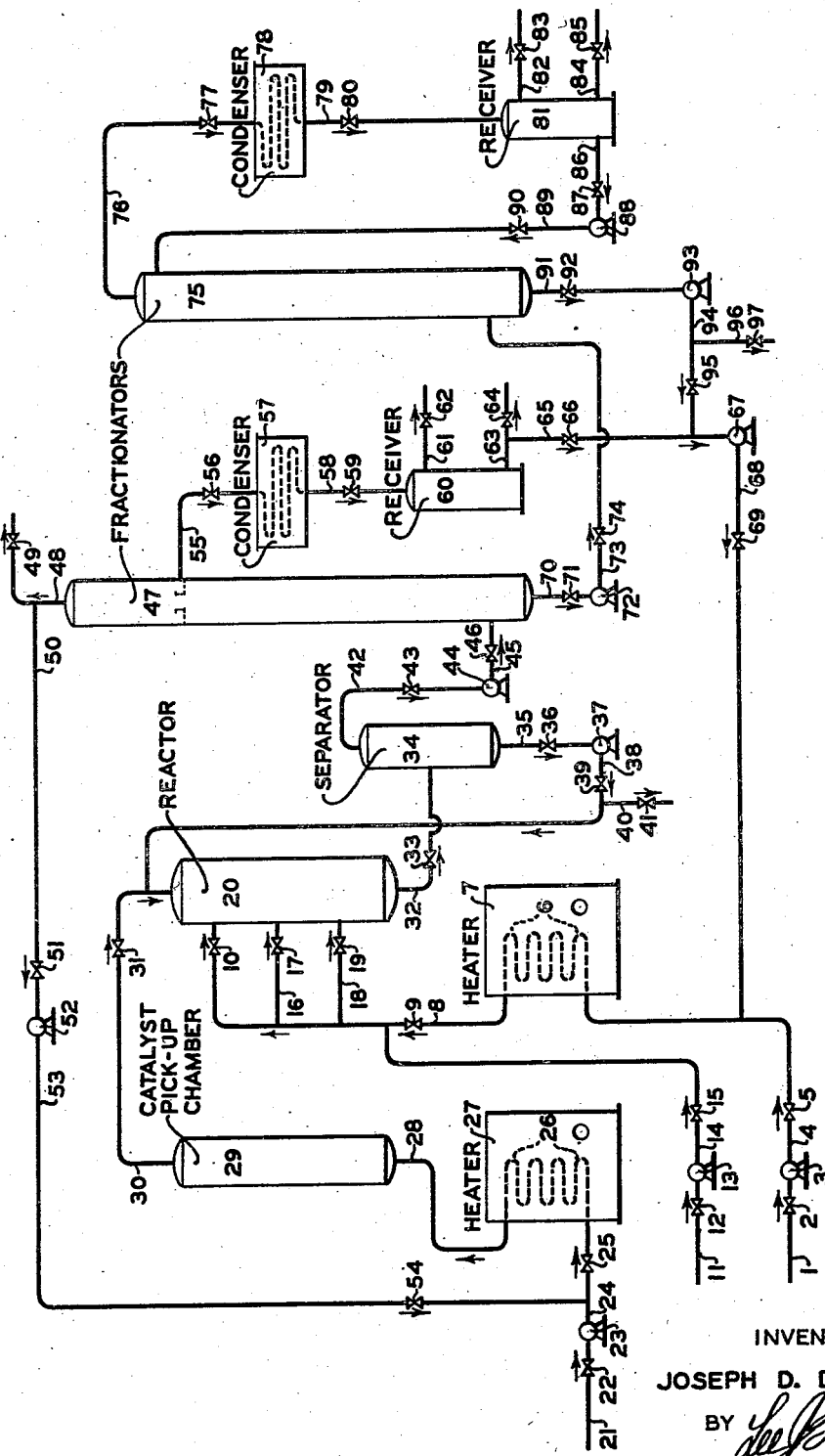

2,410,151

UNITED STATES PATENT OFFICE 2,410,151

ALKYLATION OF HYDROCARBONS

Joseph D. Danforth, Chicago, Ill., assignor to Universal Oil Products Company, Chicago, Ill., a corporation of Delaware Application February 11, 1942, Serial No. 430,517

9 Claims. (Cl. 260—671)

This application is a continuation-in-part of my co-pending application Serial No. 373,960, filed January 10, 1941, now U. S. Patent 2,342,123, issued February 22, 1944.

The present invention relates to the treatment of aromatic hydrocarbons to produce higher molecular weight alkyl derivatives thereof. More specifically the process is concerned with a method for alkylating mono-nuclear aromatic hydrocarbons and particularly benzene with a normally gaseous olefin in the presence of a volatile catalyst introduced by means of a substantially inert carrying fluid to a reaction zone containing a packing material.

In one specific embodiment the present invention comprises a process for producing alkylated aromatic hydrocarbons which comprises subjecting an alkylatable aromatic hydrocarbon to contact with an olefinic hydrocarbon in the presence of a volatile catalyst introduced by means of a fluid to a reaction zone containing a granular packing material.

In a further embodiment the present invention comprises a process for producing ethyl benzene which comprises subjecting benzene to contact with ethylene in the presence of aluminum chloride introduced to a reaction zone containing a granular packing material by means of a gas which is substantially stable to aluminum chloride.

According to the present invention aromatic hydrocarbons, including benzene and its homologs, may be alkylated with olefinic hydrocarbons and preferably with normally gaseous olefinic hydrocarbons, including ethylene, propene, and the butenes. The conditions of operation, however, may not necessarily be the same when alkylating aromatic hydrocarbons of different reactivities. Normally gaseous olefins generally combine directly with an aromatic hydrocarbon during alkylation while hexenes and higher olefins usually undergo depolymerization prior to or during alkylation with the result that 2 molecular proportions of an alkylated aromatic hydrocarbon are often formed from 2 molecular proportions of the charged aromatic hydrocarbon and 1 molecular proportion of the normally liquid olefin, while some still higher boiling olefin may depolymerize or split to a greater extent and form more than 2 molecular proportions of alkylation products.

The alkylation of an aromatic hydrocarbon such as benzene with an olefin as ethylene in the presence of aluminum chloride is generally aided by the presence of a hydrogen halide. Hydrogen chloride may be introduced to the reaction zone as a carrier for the aluminum chloride catalyst which, however, may also be carried by other gases which are substantially non-reactive with aluminum chloride as hydrogen, methane, etc.

Aluminum chloride employed as catalyst in the process of the present invention is picked up by a carrier fluid such as hydrogen, methane, hydrogen chloride, nitrogen, etc., or a mixture of at least two of these materials from a catalyst charging vessel which is maintained under a temperature necessary to introduce into the carrier fluid the desired amount of aluminum chloride. The aluminum chloride may be present in the charging vessel as a solid, a liquid, a binary or ternary mixture with other metal halides, or as an adsorbed layer on an adsorbent material such as firebrick, charcoal, silica, etc. The mixture of aluminum chloride and carrier fluid is directed to a reaction zone containing a granular packing material upon which the aluminum chloride is deposited. A mixture of the aromatic and olefinic hydrocarbons is also introduced to said packed reaction zone preferably at a plurality of points between its inlet and exit in order that the olefin will alkylate the aromatic hydrocarbon rather than undergo polymerization.

The aluminum chloride catalyst is charged continuously with the other reactants or intermittently so that as the catalyst remaining upon the packing material becomes spent during use, a further quantity of fresh aluminum chloride is introduced thereto. The packing material in the reaction zone may comprise such substances as porcelain, pumice, firebrick, quartz, activated charcoal, other activated carbons, diatomaceous earth, kaolin, raw and acid-treated clays, silica gel, alumina, magnesia, titania, composites of silica with alumina and/or zirconia, and metals disposed as to have considerable surface such as spongy iron. The alternative reactor filling materials are not necessarily equivalent and the particular adsorptive or substantially non-adsorptive packing material employed in any given alkylation reaction is dependent upon the hydrocarbons being treated, operating conditions employed, and other factors.

When relatively large reactors are employed, it may also be desirable to introduce the aluminum chloride catalyst and carrying fluid to each reactor at various points between the inlet and exit thereof so that the aluminum chloride is present in optimum concentration at all points throughout the bed of granular filling material in each reactor and also that no excess of aluminum chloride is present at the point of its introduction with a resulting deficiency of aluminum chloride at other points throughout the length of the bed of reactor filling material.

It is proposed to carry out the alkylation of benzene with ethylene, or of aromatic hydrocarbons with olefinic hydrocarbons in general, in the presence of a volatilizable catalyst carried by a fluid, particularly a substantially inert gas, into a packed reaction zone. In this operation the gaseous carrying fluid which enters the catalyst pick-up chamber is heated to a temperature between about 150° and about 350° F. and the subsequent packed alkylation reaction zone is maintained at a temperature between about 30° and about 300° F. but more preferably between about 150° and 200° F. under a pressure generally not in excess of about 500 pounds per square inch. The preferred operating pressure is generally between about 100 and about 300 pounds per square inch.

In the hydrocarbon mixture subjected to alkylation it is preferable to have a relatively high molecular ratio of aromatic to olefinic hydrocarbons, with an olefin concentration generally between about 1 and about 25 mole per cent in order to substantially avoid olefin polymerization and also to favor formation of mono-alkylated aromatic hydrocarbons with a relatively small production of poly-alkylated aromatic hydrocarbons. It is generally desirable to have hydrogen chloride present in the alkylation reaction mixture to the extent of up to about 5 mole per cent of the total hydrocarbons being subjected to contact with the alkylating catalyst. Hydrogen may also be present in the reaction mixture, usually as a component of the carrier fluid, but it is generally not present in a quantity more than about 20 mole per cent of the total hydrocarbons.

The alternative gaseous materials which may be used as carriers for introducing the aluminum chloride catalyst to the packed reaction zones are not necessarily equivalent and the particular means employed in specific cases depends upon the properties of the hydrocarbons undergoing treatment, the nature of the catalyst, the conditions of operation, and other factors.

For the purpose of illustrating the combination of steps characteristic of the present invention, the accompanying drawing shows diagrammatically one form of apparatus suitable for producing alkylated aromatic hydrocarbons by reacting an aromatic hydrocarbon with an olefinic hydrocarbon in a packed reaction zone in the presence of a volatile catalyst as aluminum chloride carried thereto by a gas which has substantially no reaction with aluminum chloride. It is understood that other types of apparatus may also be used for carrying out the process in the presence of aluminum chloride in a packed reaction zone. The apparatus shown is described in connection with the production of ethyl benzene from benzene and ethylene although the process is also applicable to the alkylation of other aromatic hydrocarbons by ethylene and its higher homologs.

Referring to the drawing, benzene is admitted through line 1 and valve 2 to pump 3 which discharges through line 4 and valve 5 into coil 6 heated by heater 7. The heated material is directed from coil 6 through line 8 containing valves 9 and 10. The heated aromatic hydrocarbon is commingled in line 8 with ethylene introduced through line 11 and valve 12 to pump or compressor 13 which discharges through line 14 and valve 15 into line 8, already mentioned. The commingled mixture of benzene and ethylene in line 8 is directed through valves 9 and 10 and through branch lines 16 and 18 containing valves 17 and 19, respectively, to reactor 20 containing a packing material and aluminum chloride introduced thereto as hereinafter set forth.

In order to introduce the aluminum chloride catalyst to reactor 20 containing packing material, a gas such as hydrogen, nitrogen, methane, hydrogen chloride, or a mixture of at least two of these gases, is admitted through line 21 and valve 22 to compressor 23 which discharges through line 24, valve 25, and coil 26 in heater 27 and thence through line 28 to catalyst pick-up chamber 29 containing preferably granular aluminum chloride although aluminum chloride may be present in said chamber as a liquid, supported on a carrier such as firebrick, or as a binary or ternary mixture with other metal halides. In chamber 29 the temperature, pressure, and amount of the carrier gas passing therethrough are controlled so as to pick up aluminum chloride in an amount desired for use as catalyst in alkylation reactor 20 to which the mixture of carrier gas and volatilized aluminum chloride is directed through line 30 and valve 31.

Although only one catalyst pick-up chamber is shown in the attached diagrammatic drawing, more than one may be used simultaneously or intermittently. Thus while a fluid is being directed through chamber 29 in order to introduce catalyst to reactor 20, one chamber similar to chamber 29 may be emptied, cleaned, and refilled with a fresh charge of aluminum chloride catalyst so that the duplicate chamber may be used in place of chamber 29 when it becomes necessary to clean and recharge the same.

The products from reactor 20 are directed through line 32 and valve 33 to separator 34 in which some relatively heavy residue or sludge-containing partially spent aluminum chloride is separated and withdrawn through line 35 and valve 36 by pump 37 which discharges through line 38 and valve 39. Sometimes in order to economize on catalyst, a portion of said residue is returned to line 30 through which the mixture of carrier fluid and aluminum chloride is directed to reactor 20. However, it is often not worth while or desirable to further utilize the residue as catalyst and accordingly all or a portion of this sludge-like material being conducted through line 38 may be withdrawn therefrom through line 40 and valve 41 to waste or storage or other treatment not illustrated in the drawing. Separator 34 may comprise any suitable means for separating used aluminum chloride from the hydrocarbons present in the reaction product.

The hydrocarbon material separated from aluminum chloride sludge in separator 34 is directed through line 42 and valve 43 to pump 44 which discharges through line 45 and valve 46 into fractionator 47 of conventional design in which gaseous materials and a mixture of unconverted ethylene and benzene are separated from higher boiling alkylated benzenes. The gaseous product, comprising essentially the gas employed as carrier for aluminum chloride and hydrogen chloride employed simultaneously as an activator for the aluminum chloride catalyst, is directed from the top of fractionator 47 through line 48 containing valve 49. At least a portion of the material being discharged through line 48 is directed therefrom through line 50 and valve 51 to compressor 52 which discharges through line 53 and valve 54 into line 24, already mentioned, through which the gaseous carrier for aluminum chloride is introduced to the process as hereinbefore set forth. Excess benzene employed in the process and ethylene, if some of this material has not undergone complete reaction in reactor 20, are removed from fractionator 47 through line 55 containing valve 56. Benzene vapors and gaseous ethylene are passed from line 55 through condenser 57 whereby the benzene vapors are condensed and ethylene is substantially dissolved therein. The resultant liquid is directed through run-down line 58 and valve 59 to receiver 60 equipped with conventional gas release line 61 containing valve 62 with liquid draw-off line 63 containing valve 64. At least a portion of the material withdrawn through line 63 is directed therefrom through line 65 and valve 66 to pump 67 which discharges through line 68 and valve 69 into line 4, already mentioned, through which the fresh charge of benzene is directed to heating coil 6 in order to heat the aromatic hydrocarbon to a temperature suitable for alkylation in reactor 20, already described.

The alkylated benzenes separated from lower boiling materials in fractionator 47 as hereinabove set forth, are directed from the bottom of said fractionator through line 70 and valve 71 to pump 72 which discharges through line 73 and valve 74 into fractionator 75 of suitable design adequate to separate the desired ethyl benzene from the poly-ethyl benzene hydrocarbons formed simultaneously with the desired mono-ethyl benzene. From the top of fractionator 75 ethyl benzene vapors are directed through line 76 and valve 77 to condenser 78 from which the liquefied ethyl benzene is conducted to run-down line 79 and valve 80 to receiver 81 equipped with conventional gas release line 82 containing valve 83 and with liquid draw-off line 84 containing valve 85. A portion of the ethyl benzene may be withdrawn from receiver 81 through line 86 and valve 87 by pump 88 and discharged through line 89 and valve 90 to near the top of fractionator 75 to assist in controlling the temperatures therein. From the bottom of fractionator 75, a mixture of alkylated benzenes of higher boiling point than mono-ethyl benzene is withdrawn through line 91 and valve 92 by pump 93 which discharges through line 94 and valve 95 into line 65, already mentioned, through which the recovered benzene is recycled to further alkylation treatment in reactor 20. A portion of the material passing through line 94 and comprising essentially polyethylated benzenes may be withdrawn through line 96 and valve 97 to waste, storage, or other use not illustrated in the diagrammatic drawing. In general the poly-ethylated benzenes so recycled to further contact with benzene in the presence of the aluminum chloride catalyst contained in packed reaction zone 20, undergo reactions to produce additional quantities of monoethyl benzene.

The following example is introduced as characteristic of the practical operation of the process although it is presented with no intention of limiting the scope of the invention in exact correspondence therewith since some latitude is possible in the choice of the type of reactor packing material, the amount of catalyst, the conditions of operation, etc.

A mixture of 1 molecular proportion of hydrogen and 1 molecular proportion of hydrogen chloride heated at 210° F. under a pressure of 250 pounds per square inch is passed upwardly through a catalyst pick-up chamber containing aluminum chloride granules and the resultant mixture of hydrogen, hydrogen chloride, and aluminum chloride is directed to a reaction zone containing formed porcelain packing material, generally termed Berl saddles, and maintained at a temperature of 160° F. Simultaneously 5 molecular proportions of benzene are heated to about 160° F., commingled with 1 molecular proportion of ethylene, and the commingled mixture is introduced to the packed reaction zone wherein the benzene is alkylated with ethylene in the presence of the aluminum chloride catalyst present on the porcelain packing material.

During the reaction in the packed reaction zone substantially all of the ethylene is consumed and a portion of the benzene is converted into ethyl benzenes. When the benzene is charged at a rate corresponding to about 2 volumes of liquid benzene per hour per volume of reactor space containing the granular packing material, ethylated benzenes are produced which are separated by fractional distillation into 92% by volume of mono-ethyl benzene and 8% of higher ethylated benzenes which are recycled to further contact with the mixture charged to the packed reaction zone.

The novelty and utility of the process of this invention are evident from the preceding specification and example, although neither section is intended to unduly limit its generally broad scope.

I claim as my invention:

1. An alkylation process which comprises reacting an aromatic hydrocarbon with an olefin in a reaction zone containing a solid packing material, introducing aluminum chloride vapors to said zone, and maintaining said zone at an alkylating temperature such as to condense at least a portion of the aluminum chloride vapors on said packing material.

2. An alkylation process which comprises reacting an aromatic hydrocarbon with an olefin in a reaction zone containing a solid packing material, introducing to said zone a carrier gas containing aluminum chloride vapors, and maintaining said zone at an alkylating temperature such as to condense aluminum chloride vapors on said packing material.

3. An alkylation process which comprises reacting an aromatic hydrocarbon with an olefin in a reaction zone containing a solid packing material, introducing to said zone hydrogen chloride gas containing aluminum chloride vapors, and maintaining said zone at an alkylating temperature such as to condense aluminum chloride vapors on said packing material.

4. An alkylation process which comprises reacting an aromatic hydrocarbon with an olefin in a reaction zone containing a solid packing material, introducing to said zone a carrier gas comprising hydrogen and containing aluminum chloride vapors, and maintaining said zone at an alkylating temperature such as to condense aluminum chloride vapors on said packing material.

5. An alkylation process which comprises reacting an aromatic hydrocarbon with an olefin in a reaction zone containing a solid packing material, introducing to said zone a carrier gas comprising hydrogen chloride and containing aluminum chloride vapors, and maintaining said zone at an alkylating temperature such as to condense aluminum chloride vapors on said packing material.

6. An alkylation process which comprises reacting an aromatic hydrocarbon with an olefin in a reaction zone containing a solid packing material, introducing to said zone a carrier gas containing aluminum chloride vapors, and maintaining said zone at a temperature between about 30° F. and about 300° F. whereby to deposit aluminum chloride on said packing material.

7. An alkylation process which comprises reacting a mono-nuclear aromatic hydrocarbon with a normally gaseous olefin in a reaction zone containing a solid packing material, introducing to said zone a carrier gas containing aluminum chloride vapors, and maintaining said zone at a temperature between about 30° F. and about 300° F. whereby to deposit aluminum chloride on said packing material.

8. A process for producing alkylated benzene hydrocarbons which comprises reacting benzene with an olefin in a reaction zone containing a solid packing material, introducing to said zone a carrier gas containing aluminum chloride vapors, and maintaining said zone at a temperature between about 30° F. and about 300° F. whereby to deposit aluminum chloride on said packing material.

9. A process for producing alkylated benzene hydrocarbons which comprises reacting benzene with ethylene in a reaction zone containing a solid packing material, introducing to said zone a carrier gas containing aluminum chloride vapors, and maintaining said zone at a temperature between about 30° F. and about 300° F. whereby to deposit aluminum chloride on said packing material.

JOSEPH D. DANFORTH.